April 12, 1966   B. B. MATHIAS ETAL   3,245,531
INSPECTING ARTICLES
Filed July 11, 1960   6 Sheets-Sheet 1

INVENTORS
BENNY B. MATHIAS &
ELLSWORTH M. MURLEY JR.
BY W. A. Schaich &
C. S. Lynch
ATTORNEYS

INVENTORS
BENNY B. MATHIAS &
ELLSWORTH M. MURLEY JR.
ATTORNEYS

April 12, 1966  B. B. MATHIAS ETAL  3,245,531
INSPECTING ARTICLES
Filed July 11, 1960  6 Sheets-Sheet 6

INVENTORS
BENNY B. MATHIAS &
ELLSWORTH M. MURLEY JR.
BY W.A. Schaich
C.S. Lynch
ATTORNEYS United States Patent Office 3,245,531
Patented Apr. 12, 1966

3,245,531
INSPECTING ARTICLES
Benny B. Mathias and Ellsworth M. Murley, Jr., Toledo, Ohio, assignors to Owens-Illinois Glass Company, a corporation of Ohio
Filed July 11, 1960, Ser. No. 42,027
19 Claims. (Cl. 209—111.5)

This invention relates to inspecting articles and particularly to measuring the shape or profile of hollow containers such as glass containers.

In the filling, handling and dispensing of hollow containers, it is necessary that the containers be of uniform size and shape in order that high speed filling and handling machinery can be used. Such uniformity of size and shape is also necessary because any variations in size and shape will be readily apparent after filling since the level of the contents will vary when the containers are filled with a predetermined quantity. It is therefore important to reject containers during manufacture which vary from a predetermined standard size and shape. Heretofore this has been accomplished primarily by a visual inspection. Such an inspection, of course, is subject to human error and therefore not entirely satisfactory.

It is an object of this invention to provide a method and apparatus for quickly measuring the shape or profile of an article such as a glass container so that the container can be rejected.

It is a further object of this invention to provide such a method and apparatus which utilizes rays of radiant energy so that there is no physical contact of apparatus with the glass container.

It is a further object of the invention to provide novel means for measuring the shape or profile of an article such as a glass container.

Basically, the invention comprises horizontally scanning successive transverse areas of the projected image of an upright container as it is rotated about its longitudinal axis. The fluctuations or changes in radiant energy at each vertical edge of the container are detected by producing a generally square wave electrical signal which is amplified, differentiated to produce pulses which are separated in time corresponding to the diameter of the container and then comparing these pulses with a standard to determine whether or not the shape or profile of the container meets the standard. If it does not meet the standard, the container is rejected. The image of the container can be formed in various ways. When the article being inspected is a glass container, ultra-violet radiation can be used to form the image of the container. Visible light rays can also be used to form the image. During the scanning, the container is rotated relatively slowly and the image is scanned at a relatively high rate.

Figures 1, 2, 3, 4:
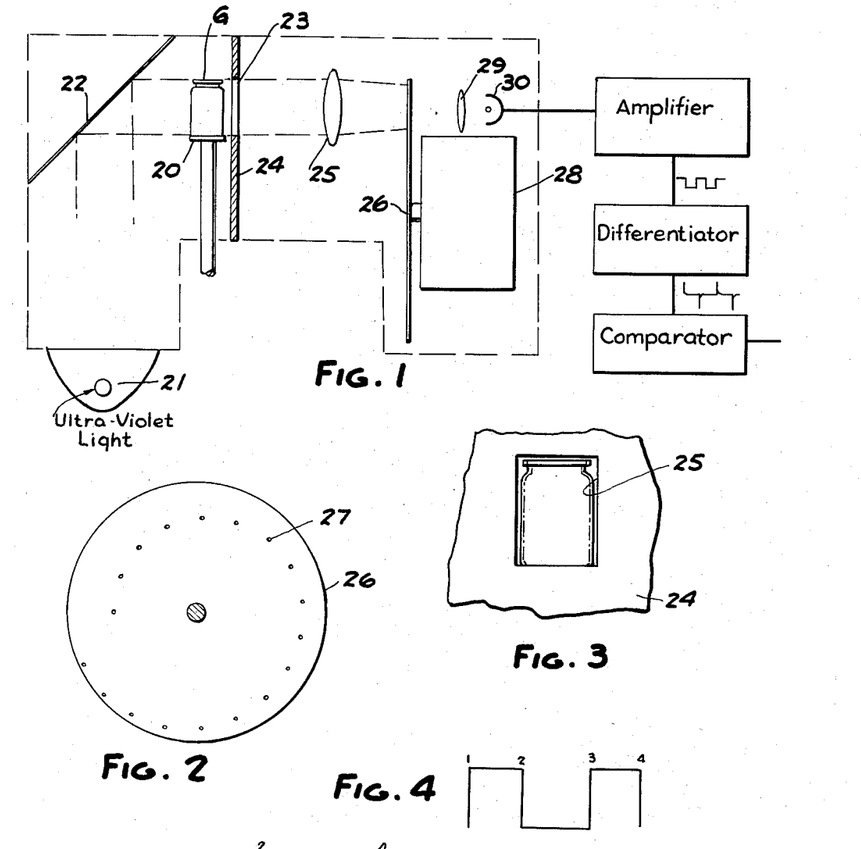
FIG. 1 is a diagrammatic view of an apparatus for performing the method comprising the invention.
FIG. 2 is an elevation of the scanning disc used in the apparatus shown in FIG. 1.
FIG. 3 is a fragmentary elevation of the mask used in the apparatus shown in FIG. 1.
FIG. 4 is a showing of the wave form of the signal produced by the apparatus shown in FIG. 1 after it is amplified.

Referring to FIG. 1, an article such as a glass container G is placed on a pad 20 which is rotated at a slow speed to rotate the container G about its longitudinal axis. Parallel rays from an ultra-violet source 21 are reflected by a brushed aluminum reflector 22 onto the container G thus back lighting the container. Since ultra-violet rays will not pass through glass, the rays silhouette the container G and pass through an opening 23 in a wall 24 and are focused by a lens 25 into a container image in the plane of a Nipkow disc 26 which is positioned with its plane substantially parallel with the axis of the container G. As shown in FIG. 2, the Nipkow disc 26, which has a spiral row of holes 27 in a conventional manner, is rotated about its axis by a motor 28 thereby successively scanning horizontal areas of the container G. Each hole in Nipkow disc 26 traverses a different horizontal area of the container G. The image directed against the Nipkow disc is that of a substantially black container on a white background because the ultra-violet rays are not transmitted through the glass. Rays passing through each hole 27 are directed by a lens 29 to a photocell 30 which is sensitive to ultra-violet rays. The circumferential spacing between holes 27 in the Nipkow disc is greater than the width of the container being checked in accordance with conventional construction of Nipkow discs. The number of holes 27 corresponds with the number of scannings per height of the container being checked.

Figure 5:
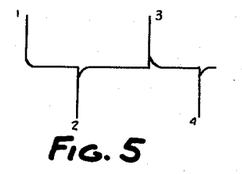
FIG. 5 is a showing of the wave form of the signal after it has been differentiated.

As each hole 27 in disc 26 sweeps across the image, ultra-violet rays are permitted to pass to the photocell 30 so that the photo tube will conduct while the background is being scanned but will not conduct while the container is being scanned. This produces a signal which, after amplification, is in the form of a wave such as shown in FIG. 4. More specifically as shown in FIG. 4, the photo tube conducts when the background is being scanned from position 1 to 2, does not conduct when the container is being scanned from position 2 to 3 and again conducts when the background is being scanned from position 3 to 4. This signal is amplified if necessary and is then differentiated in a differentiator to convert its form to a signal giving pulses as shown by the wave form in FIG. 5; pulse 1 representing the beginning of the background, pulse 2 representing the leading edge of the container, pulse 3 representing the trailing edge of the container and pulse 4 representing the end of the background. Because the angular scanning velocity is constant, the pulses 2 and 3 are separated in time in direct proportion to the container diameter. In this fashion, the distance represented by the container diameter is transformed into time. The differentiator operates to convert the wave form shown in FIG. 4 to the signal comprising four impulses as shown in FIG. 5 and may be of any conventional type such as the RC type. The signal from the differentiator comprising four pulses as shown in FIG. 5 is then fed to a comparator unit which compares the time sequence between the pulses 2 and 3 with a standard and causes a reject signal when containers do not meet the standard.

Figure 7:
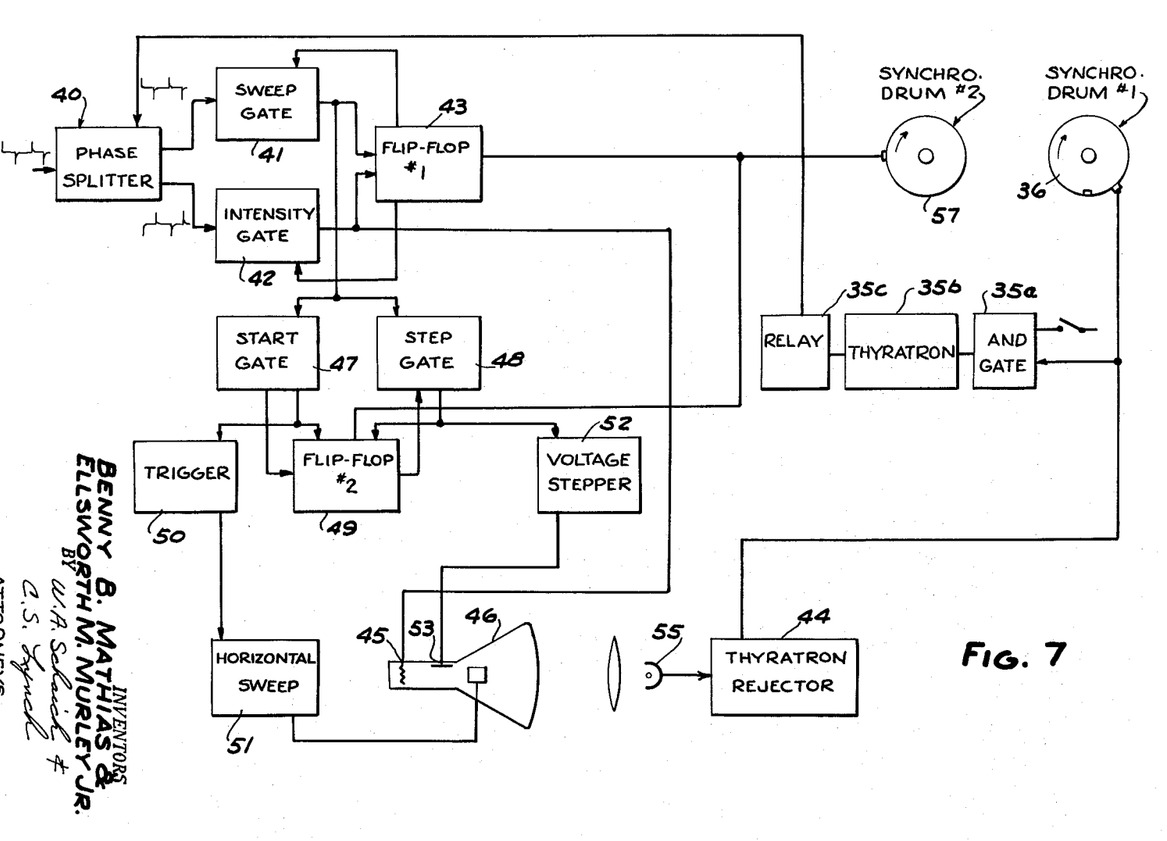
FIG. 7 is a diagrammatic wiring diagram of the comparator used in connection with the apparatus shown in FIG. 1.

Various types of camparator units can be used. In one type such as shown in FIG. 7 the signal having wave form shown in FIG. 5 is used to energize and de-energize a cathode ray tube sweep. A mask of predetermined width corresponding to the permissible deviation of the container diameter is positioned over the cathode ray tube and a photo tube adjacent the mask is used to sense any deviations from the standard by noting whether the energization of the cathode ray tube sweep occurs in synchronism with the mask or out of synchronism with the mask. If the energization is out of synchronism, the photo tube is caused to energize a thyratron circuit rejecting the container.

Figure 12:
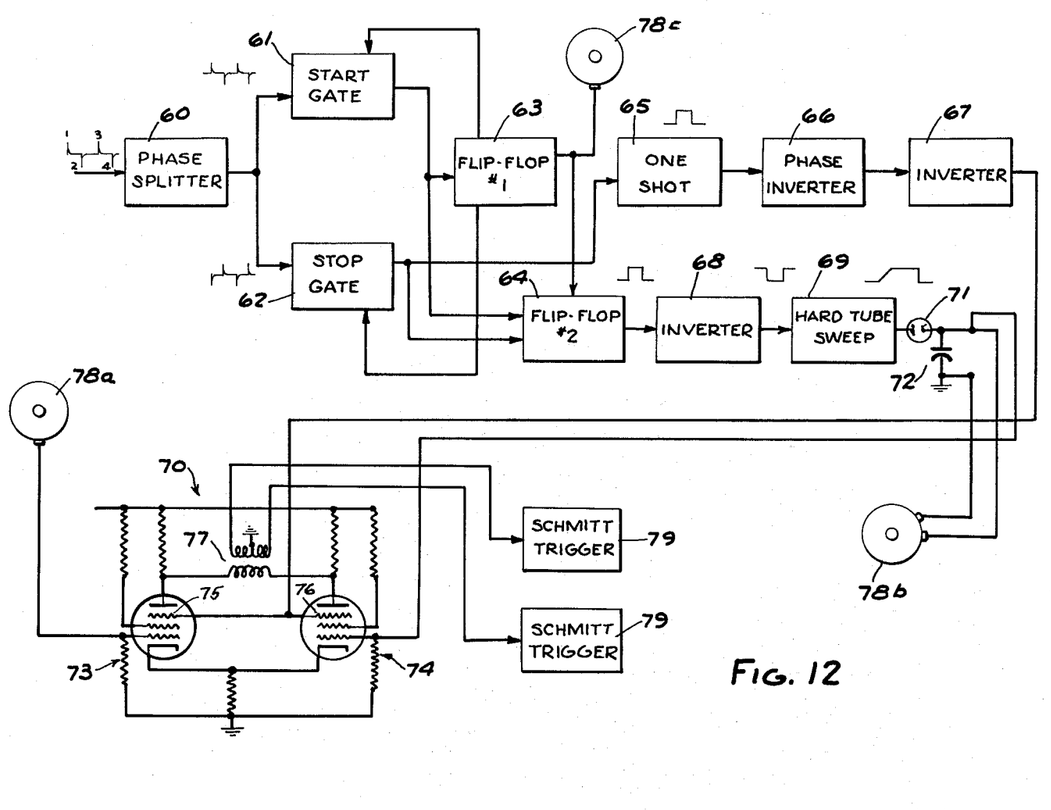
FIG. 12 is a diagrammatic wiring diagram of a modified form of comparator unit which is used in connection with the apparatus shown in FIG. 1.

In another form of comparator as shown in FIG. 12, the signal shown in FIG. 5 is caused to produce a voltage having a magnitude proportional to the diameter of the container. This is compared with a standard voltage and the ware is caused to be rejected if it deviates more than a permissible amount from the standard.

Figures 13, 14:
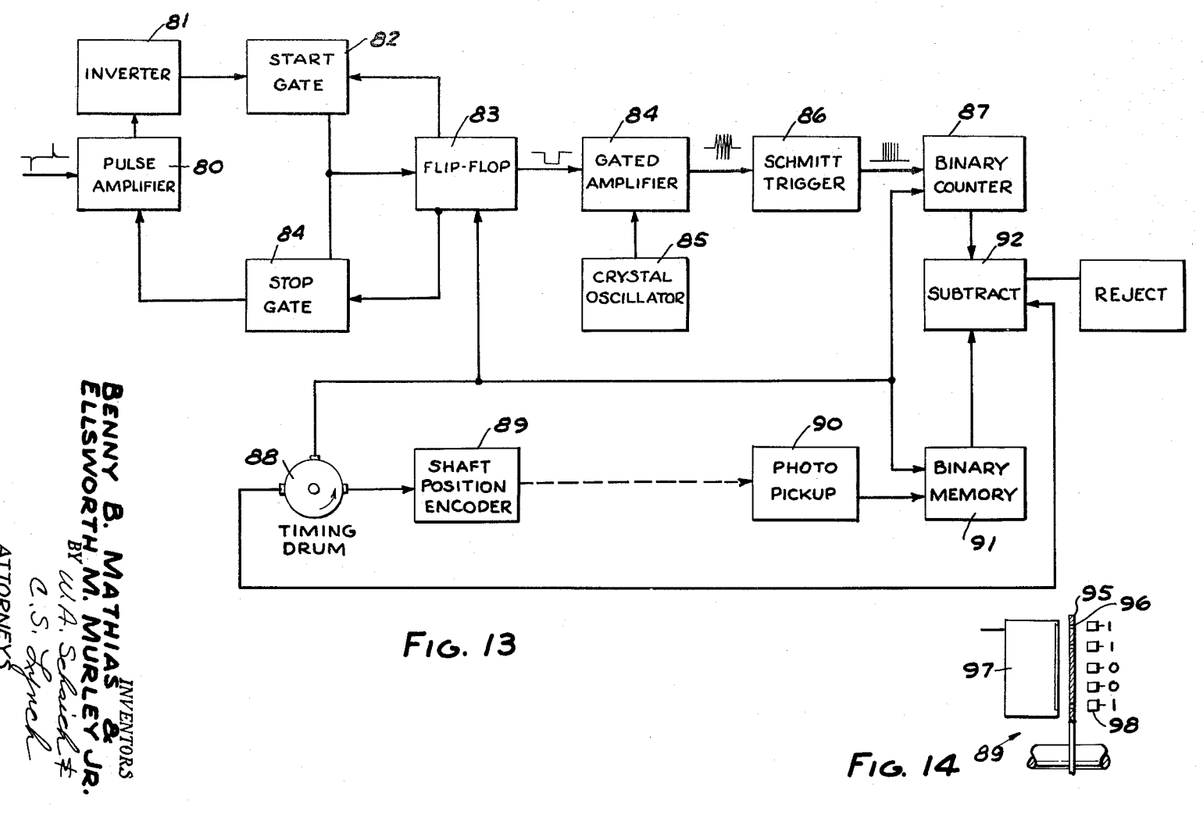
FIG. 13 is a diagrammatic wiring diagram of a further modified form of comparator unit.
FIG. 14 is a diagrammatic view of a portion of an apparatus used in connection with the comparator unit shown in FIG. 13.

In another form of comparator unit as shown in FIG. 13, the signal shown in FIG. 5 is caused to initiate a counting or digital circuit in proportion to the time between the portions of the signal repreesnting the edges of the container. This is compared with the standard proportional to the standard diameter of the container and if the container deviates more than a permissible amount the container is rejected.

Figure 6:
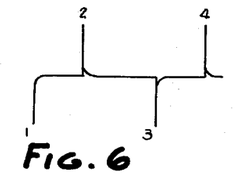
FIG. 6 is a showing of the wave form of the signal after passing through a part of the comparator unit.

As shown in FIG. 7, the comparator comprises a phase inverter or splitter 40 to which the signal shown in FIG. 5, in the form of four pulses, is fed. The phase splitter can be of any well-known type such as single tube paraphase amplifier and operates to produce signals of opposite polarity. Thus, phase splitter 40 produces a first signal similar to that shown in FIG. 5 and a simultaneous second signal such as that shown in FIG. 6. The signal of FIG. 5 is fed to a sweep gate 41 and the signal of FIG. 6 is fed to an intensity gate 42. Sweep gate 41 and intensity gate 42 are of the transmission type, that is, wherein the output is approximately a replica of the input. The output of the sweep gate is in turn fed to a first flip-flop 43 which is electrically connected to sweep gate 41. Flip-flop 43 is a bistable multi-vibrator or binary. The output of intensity gate 42 is directed to flip-flop 43 and in addition energizes the beam 45 of cathode ray tube 46. The output of the sweep gate 41 is also directed to a start gate 47 which, in turn, controls a signal to a trigger 50 and a second flip-flop 49. The output of the sweep gate 41 also passes to a step gate 48 which, in turn, controls flip-flop 49 and a voltage stepper 52. Start gate 47 and step gate 48 are of the transmission type and flip-flop 49 is a bistable multi-vibrator or binary. Trigger 50 controls horizontal sweep 51 of cathode ray tube 46. Voltage stepper 52 provides a step-by-step vertical deflection of the signal of the cathode ray tube 46 as at 53.

At the state of the measurement, sweep gate 41 is on, intensity gate 42 is off, start gate 47 is on, step gate 48 is off and the sweep 45 is at the rest position. As shown in FIGS. 5 and 6, the four pulses are divided by the phase splitter into positive and negative pulses corresponding to each of the four pulses. Positive pulse 1, negative pulse 2, positive pulse 3 and negative pulse 4 are fed consecutively to sweep gate 41 while the complementary pulses, negative pulse 1, positive pulse 2, negative pulse 3 and positive pulse 4 are fed to the intensity gate 42. As pulse 1 representing the beginning of the background enters the comparator unit nothing will occur because the intensity gate 42 is off, the sweep gate 41 will accept only negative pulses and pulse 1 to sweep gate 41 is positive. As pulse 2 representing the leading edge of a container G enters the comparator unit, the unit is activated in the following manner: negative pulse 2 activates sweep gate 41 sending a pulse out. This pulse activates flip-flop 43 which gates the intensity gate 42 on and the sweep gate 41 off. The pulse from the sweep gate 41 also passes through the start gate 47 and activates flip-flop 49. This gates the step gate 48 on and the start gate 47 off. The pulse from sweep gate 41 also goes to the trigger 50 which activates the horizontal sweep 51 starting the sweep across the cathode ray tube 46. The beam 45, however, is gated off and therefore a photocell 55 positioned adjacent the face of the cathode ray tube will not detect any signal.

As pulse 3, representing the trailing edge of container G, enters the circuit, the negative pulse 3 passes through the intensity gate 42 and activates flip-flop 43. This turns the sweep gate 41 on and the intensity gate 42 off. The pulse from the intensity gate 42 turns the beam 45 of the cathode ray tube on. A mask is positioned on the cathode ray tube 46 as presently described so that if the container is within tolerance the beam will light behind the mask and no light will fall on the photocell 55. If the container is out of tolerance then the beam will not light behind the mask but will cast a light on the photocell 55 energizing thyratron rejector 44 and producing a signal to reject the bottle by an appropriate mechanism not shown. As the negative pulse 4 enters the sweep gate 41 it passes through the sweep gate 41 and flip-flop 43 gating the sweep gate 41 to off position. The positive pulse 4 gates the intensity gate 42 to on position. The pulse then passes through the step gate 47 and activates flip-flop 49 gating the start gate 47 on and the step gate 48 off. The pulse then activates the voltage stepper 52 which applies a voltage to the vertical deflecting plates 53 thereby conditioning them so that the beam of the cathode ray tube is properly positioned for the next diameter measurement of the cathode ray tube.

Figure 8:
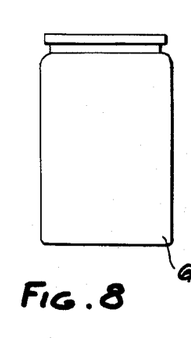
FIG. 8 is an elevation of a typical container which is inspected with the apparatus shown in FIG. 1.
Figure 9:
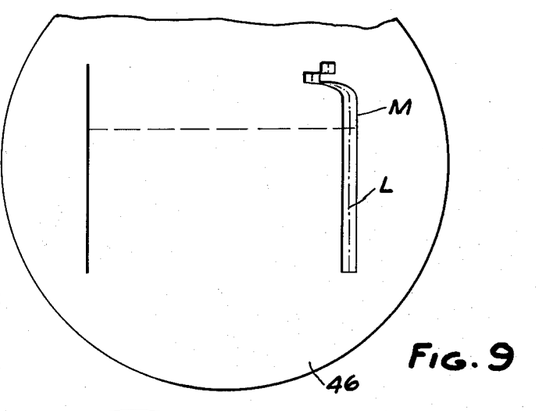
FIG. 9 is an elevation of the mask for the cathode ray tube of the comparator unit shown in FIG. 7 for inspecting the container shown in FIG. 8.

Referring to FIGS. 8 and 9, if a container G such as shown in FIG. 7 is being tested, the mask M which is applied to the face of the cathode ray tube 46 may have the dimensions shown in FIG. 8, the dotted line L representing the proper dimensions of the container G and the width of the mask M representing the permissible deviation. Thus, when the beam of the cathode ray is turned on, if the spot on the face of the cathode ray tube lies behind the mask M, no light passes to the photocell and the container is within the tolerances which have been established. If, however, a light does not strike behind the mask, the light will be picked up by the photocell rejecting the container since the container does not lie within the specified tolerances.

Figure 10:
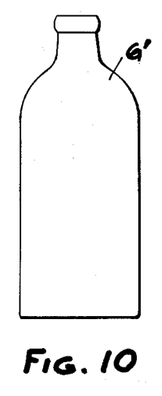
FIG. 10 is an elevational view of another type of container which may be tested in the apparatus shown in FIG. 1.
Figure 11:
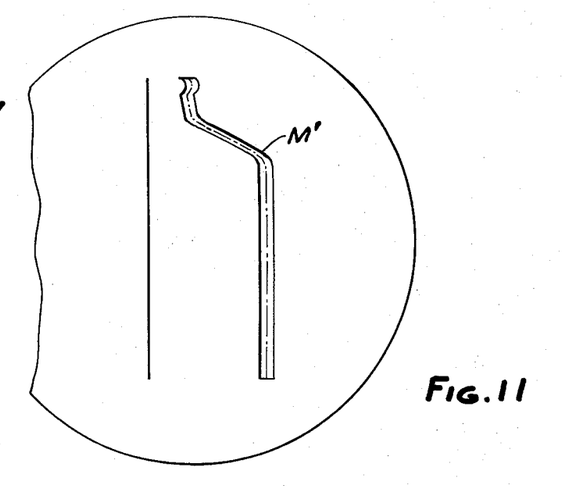
FIG. 11 is a mask for the cathode ray tube of the comparator shown in FIG. 7 as used for inspecting the container shown in FIG. 10.

The shape of the mask will, of course, vary depending upon the shape of the container. For example, in testing the container G' shown in FIG. 10, a mask such as M' in FIG. 11 is used. It can, of course, be appreciated that the mask need not have the exact dimensions but may have some ratio to the actual size of the bottle. The height of the mask is not critical but it is essential that the proper ratio of width of the mask to permissible deviation in width of the container be maintained. It is preferred that the width of the mask be some multiple of the permissible deviation of the container thereby making the reading more accurate.

Provision must be made in the comparator shown in FIG. 7 to insure that the comparator will not begin to operate until the outermost hole in the Nipkow disc is in position to sweep or scan the container. In addition, no measurement should be taken until a container is placed in the mask. Finally, the thyratron rejector 44 and the flip-flops 43, 49 should be reset after each inspection. As shown in FIG. 7, a microswitch is provided in association with the pad 20, in a manner not shown, so that a circuit is provided only if a container is on the pad. A synchronizing drum 36 driven by the shaft of the Nipkow disc rotates in synchronism therewith. A proximity pick-up is mounted in association with drum 36 so that a pulse is produced after the bottom hole of the Nipkow disc has swept past the container and before the top hole has swept past the container. The signals from the microswitch and from the drum 36 are fed to "and" gate 35a which in turn energizes a thyratron 35b and provides a pulse to a relay 35c which activates the pulse shaper 40. In this manner, the comparator shown in FIG. 7 is not energized until a container is in position and until the top hole of the Nipkow disc is in proper relation for beginning the scanning of the container.

At the end of each inspection, that is, when the Nipkow disc has made a single revolution scanning the container, the thyratron 44 and thyratron 35b in the circuit with the drum 36 must be reset. This is accomplished momentarily by interrupting the plate voltage through the drum 36. The resetting of flip-flops 43 and 49 at the end of each complete scanning of the container is accomplished by a second synchronizing drum 57 which is driven by the shaft of the Nipkow disc and operates to generate a pulse for resetting the flip-flops 43, 49.

It can thus be seen that by using the comparator shown in FIG. 7, the container diameter at successive portions of the container is measured instead of the radius. The container need not be accurately indexed because the comparator is synchronized by the image scanner pulses. The cost of the material handling apparatus is comparatively low since it is only necessary to place the container on the pad and remove it therefrom. The use of a mask on the cathode ray tube permits the mask to be some reasonable multiple of the container size thus facilitating the accuracy of the measurement obtained. Scanning of the standard container is not needed or required in the comparator shown in FIG. 7. Thus, a duplicate image scanner is not used saving substantially in the cost of equipment. In order to measure different shapes or sizes of containers it is only necessary to change the Nipkow disc and the mask over the cathode ray tube.

The comparator unit shown in FIG. 12 operates on the pulse wave signal shown in FIG. 5 to generate a D.C. voltage that is proportional to the diameter of the container. This voltage is then compared with the standard voltage and if the difference between the voltages exceeds a predetermined value the container is rejected. As shown in FIG. 12, the comparator includes a phase splitter 60 which can be of any well-known type such as a single tube paraphase amplifier and operates to produce both positive and negative pulses for each signal like those shown in FIGS. 5 and 6, in the same manner as phase splitter 40 of the comparator shown in FIG. 7. Start gate 61 and stop gate 62 are electrically connected to flip-flops 63, 64. Start and stop gates 61, 62 are of the transmission type and flip-flops 63, 64 are bistable multi-vibrators or binaries. In addition, the stop gate 62 is electrically connected to a one shot 65 and, in succession, a phase inverter 66 and inverter 67. One shot 65 is of the well-known monostable multi-vibrator type, phase inverter 66 is of the paraphase amplifier type and inverter 67 is of the paraphase amplifier type. The output of flip-flop 2 passes in succession to an inverter 68, a hard tube sweep 69 and a gated bridge 70. Inverter 68 is of the paraphase amplifier type. Hard tube sweep 69 is of the integrator type and functions to emit a D.C. voltage supplied to capacitor 72 through a diode 71, the voltage being proportional to the width of the square waves entering the hard tube sweep 69. Gated bridge 70 comprises a pair of pentode D.C. amplifiers connected as a Wheatstone bridge.

As shown in FIG. 12, the positive pulses 1 and 3 and negative pulses 2 and 4 are fed to the start gate and negative pulses 1 and 3 and positive pulses 2 and 4 are fed to the stop gate in succession.

At the beginning of the measurement, start gate 61 is on, stop gate 62 is off and gated bridge 70 is off. Positive pulse 1 representing the background lighting of the container does not activate the start gate 61 since it is of the wrong polarity and negative pulse 1 does not activate stop gate 62 since stop gate 62 is off. Negative pulse 2 passes through start gate 61 to flip-flops 63, 64. The pulse entering flip-flop 63 gates the start gate 61 off and the stop gate 62 on.

This also cuts off one section of flip-flop 64. Negative pulse 3 passes through the stop gate 62 and is applied to flip-flop 64. Positive pulse 3 does not pass through start gate 61 since start gate 61 is off. The pulse from stop gate 62 causes the one section of the flip-flop 64 to again conduct. The output of the flip-flop 64 is a square wave the width of which is the time difference between pulses 2 and 3. This square wave is inverted by inverter 68 and fed to a hard tube sweep 69. The hard tube sweep circuit 69 applies a D.C. voltage across a capacitor 72 that is proportional to the time the square wave is applied to the circuit. Capacitor 72 charges through a diode vacuum tube 71 and therefore the voltage appearing across it is held at a point that is proportional to the width of the square wave which in turn is proportional to the container diameter. This voltage is directly coupled to one of the grids of gated bridge 70. Gated bridge 70 consists of two pentode D.C. amplifiers 73, 74 connected in a manner of a Wheatstone bridge. They are cut off by a negative potential on the suppressor grids 75, 76.

A pulse transformer 77 is connected between the plate of the amplifiers 73, 74. The D.C. voltage from the hard tube sweep is connected to the grid of one of the amplifiers and a reference voltage is connected to the grid of the other amplifier. The reference voltage is a measure of the diameter of a standard container. The voltage applied for reference purposes can be generated by a voltage divider in proportion with the varying diameter along the height of a container. The voltage divider output may be fed to the unit by a slip ring and commutator assembly 78a which is synchronized with a proper pin hole in the Nipkow scanning disc. When both the signal voltage and reference voltage are applied to the grids of the gated bridge 70, a delayed pulse from the one shot 6 which is activated by pulse 3 gates the circuit on. If there is no potential difference between the voltages to the gated bridge 70 there will be no output from the bridge. If a potential difference exists, a pulse will be generated. The polarity of the pulse will depend upon whether the voltage is larger or smaller than the container voltage. The pulse height will be proportional to the difference in voltage. The output from the gate bridge, if any, is fed to voltage discriminating circuits such as Schmitt triggers 79. If the height of the pulse shows that the container is out of tolerance, one of the triggers will fire causing a signal for rejecting the container. Pulse 4 does not affect the circuit and the start gate is off when pulse 4 enters the comparator unit.

In the form of comparator shown in FIG. 12, provision must be made for insuring that the comparator will not operate until a container is placed on the pad before the Nipkow disc. This may be accomplished by utilizing microswitch and synchronizing arrangement such as shown in connection with the comparator of FIG. 7 namely, the use of a synchronizing drum 36, microswitch and a gate 35a, thyratron 35b and relay 35c. For purposes of clarity, this has not been shown in connection with the comparator of FIG. 12 but such an arrangement would be operated and connected in the same fashion as described with reference to FIG. 7.

In addition, in the comparator shown in FIG. 12, provision must be made for shorting out the capacitor 72 after each diameter is scanned. This is accomplished as shown in FIG. 12, by providing a drum 78b driven by the shaft of the Nipkow disc which includes a commutator and brush assembly that operates to short the capacitor 72 after each scanning of each diameter.

It is also necessary in the comparator shown in FIG. 1 to reset flip-flops 63, 64 after each revolution of the Nipkow disc for completely scanning the container and is may be accomplished by a synchronizing drum 78c which operates to provide a pulse after each revolution of the Nipkow disc to rest flip-flops 63, 64.

The comparator shown in FIG. 13 utilizes a counter digital circuit to compare the time interval between pulses with a predetermined time corresponding to the standard container diameter.

The specific comparator unit shown in FIG. 13 utilizes a circuit which measures a known distance minus the distance corresponding to the container diameter thereby simplifying the circuitry. As shown in FIG. 13, a pulse signal from the apparatus having form shown in FIG. 5 is fed to a pulse amplifier 80 and in turn to an inverter 81, start gate 82 which is electrically connected to a flip-flop 83 and a stop gate 84. The output of the flip-flop 83 passes in turn to a gated amplifier 84 (to which an oscillating current is provided by a crystal oscillator 85), a Schmitt trigger 86 and a binary counter 87. Binary counter 87 is of the cascaded flip-flop or binary type. A timing drum 88 operated in connection with the Nipkow disc is connected in a circuit with a shaft position coder 89 for controlling a binary memory circuit 91 through a photo pick-up 90. The binary counter 87 and binary member 91 have their outputs directed to a subtractor unit 92 which is of the parallel entry type common in digital computers.

At the beginning of the measuring operation, the start gate 82 is on and the stop gate 84 is off, the gated amplifier 84 is off, binary counter 87 is set at zero and the binary memory circuit is set at zero. A subtractor unit 92 is off.

As pulse 1 enters the comparator unit it passes through inverter 81 and start gate 82 to actuate the flip-flop 83. The flip-flop 83 is triggered and gates the start gate 82 off and the stop gate 84 on. The gated amplifier is also gated on by the flip-flop 83. This allows the sine wave from crystal oscillator 85 to pass through the gated amplifier 84 to Schmitt trigger 86. The Schmitt trigger converts the sine waves to rectangular pulses, one pulse per wave cycle. These pulses are counted in the binary counter 87. Pulse 2 representing the leading edge of the container passes through the stop gate 84 and triggers the flip-flop 83 gating the start gate 82 on and the stop gate 84 off. The gated amplifier is also gated off stopping the binary counter 87. Pulses 3 and 4 operate in a similar manner as pulses 1 and 2, pulse 3 representing the trailing edge of the container, so that the end of a four-pulse sweep the number registered on the binary counter 87 proportional to a fixed distance minus the container diameter. During the time that the binary counter is being operated, a shaft position encoder 89 and photo pick-up 90 impresses upon the binary memory 91a number corresponding to a fixed distance minus the diameter of a standard container. After the number is registered in both the counter and memory, the subtractor is gated by the timing drum 88. The output of the subtractor is the difference between the binary counter reading and the binary memory setting. This difference is fed to a reject mechanism and the container is rejected if it is out of tolerance. As shown in FIG. 14, the shaft coder 89 may comprise a disc 95 driven by the shaft of the Nipkow disc and having a plurality of openings therein positioned at predetermined points corresponding to the number that is to be impressed on the binary memory. A light 97 on one side of the hole serves to illuminate the holes and photo diodes 98 on the other side of the holes pick up the light which passes through predetermined holes. A series of holes is provided for each diameter being checked so that as the Nipkow disc rotates, disc 95 also rotates presenting a different arrangement of openings 96 corresponding to the diameter being checked at that time. As each row sweeps by the photo diodes 98, a binary number is impressed on the diodes and this is passed through photo pick-ups to the binary memory.

Figure 15:
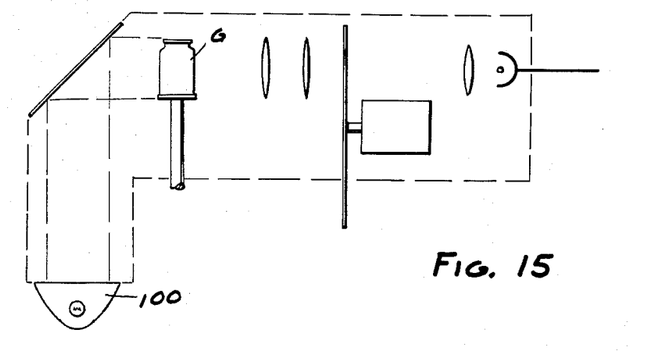
FIG. 15 is a diagrammatic view of a modified form of apparatus embodying the invention.
Figure 16:
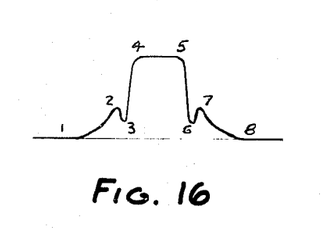
FIG. 16 is a showing of the wave form of the signal from the amplifier stage in the apparatus shown in FIG. 13.

Instead of utilizing the apparatus shown in FIG. 1 to obtain a photocell signal, the apparatus shown in FIG. 15 may be used. This apparatus differs from that shown in FIG. 1 in that an incandescent light source 100 replaces the ultra-violet light source. The output of the photocell obtained by utilizing the apparatus shown in FIG. 15 produces a wave form such as shown in FIG. 16. In traversing the background, a hole in the Nipkow disc produces a build up of current between points 1 and 2, the point 2 representing the one edge of the container. As the hole in the Nipkow disc arrives the edge of the container, the light passing to the photocell is diminished and the current output of the photocell drops as from 2 to 3, 3 corresponding to the edge of the container. As the hole further travels along the container image, the photo current remains approximately constant as it scans across the container image as from number 4 to 5. As the hole arrives at the trailing edge of the container, the light passing to the photocell is diminished and the current output of the photocell drops as from 6 to 7. As the hole passes the trailing edge of the container, the light passing to the photocell produces a current as at 8. Since the wave form is symmetrical about a vertical axis, the wave form shown in FIG. 16 is electrically differentiated twice with respect to time producing the wave shown in FIG. 17 thereby providing impulses at points corresponding to the edges of the container.

Figure 17:
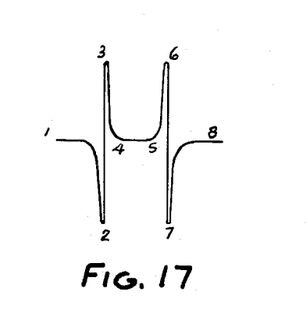
FIG. 17 is a showing of the wave form of the signal from the differentiator stage of the apparatus shown in FIG. 13.

The impulse wave form shown in FIG. 17 may then be provided to any of the above described comparator units to compare the container diameter with a standard and reject the container if it does not conform with the predetermined tolerances.

We claim:

1. The method of inspecting the shape of a container which comprises scanning a cross section of said container with rays of radiant energy to cause fluctuation of said rays at the edges of said cross section, converting said fluctuation in rays to electrical pulses related in time to one another in an amount proportional to the distance between the edges of said container, comparing the time sequence between the pulses with a standard and rejecting the container when the time sequence of said pulses deviates more than a permissible amount from the standard.

2. The method of measuring the shape of the container which comprises scanning successive cross sectional areas of the container by directing rays of radiant energy across said areas to produce changes in the energy corresponding to the edges of each area, converting said changes in energy to electrical pulses which are spaced apart in time in proportion to the distance between the edges of the container, energizing the beam of a cathode ray tube by said pulses thereby illuminating the cathode ray tube face at points corresponding to the edges of the container, detecting the deviation of said points from predetermined positions on the cathode ray tube corresponding to the position said spots should be in for a standard container and rejecting said container when the spots deviate from said permissible positions.

3. The method of measuring the shape of a container which comprises scanning successive cross sections of said container by directing rays of radiant energy across said cross sectional areas to produce variations in the projected rays past said container corresponding to the edges of each area, converting said variations in energy into electrical pulses which are spaced apart in time in an amount proportional to the distance between the edges of said cross sectional area, said pulses corresponding to the background illumination, the first edge of the container, the second edge of the container, and the background illumination of said container, energizing a counting circuit by said first pulse, de-energizing said counting circuit by said second pulse, reactivating said counting circuit and by said third pulse stopping said counting circuit by said fourth pulse whereby said counting circuit will register the difference between a fixed distance and the distance between the edges of the cross sectional area, and comparing the reading of said counting circuit with a standard corresponding to the difference between said fixed distance and the diameter of a standard container at a corresponding cross section.

4. The method of measuring the shape of a container which comprises scanning successive cross sections of said container by directing rays of radiant energy across successive cross sectional areas thereby producing a fluctuation in energy at the edges of said cross sectional area, converting said fluctuation in energy to electrical pulses that are spaced apart in time in an amount corresponding to the distance between the edges of the cross sectional area, said pulses corresponding to a first pulse representing the background of the container, a second pulse corresponding to the one edge of the container, a third pulse corresponding to the other edge of the container and a fourth pulse corresponding to the background of the container, activating the sweep of a hard tube by said second pulse, and stopping the sweep of said hard tube by said third pulse thereby producing a voltage corresponding in magnitude to the time between the second and third pulse, and comparing said voltage with a standard voltage corresponding to the diameter of a standard container at a corresponding cross sectional area.

5. The method of measuring the shape of a glass container which comprises rotating said glass container about its axis, directing light rays against said glass container in a direction perpendicular to the axis of said container, positioning a photocell adjacent said container in the path of said light rays, interposing a scanning mechanism between said photocell and said container for successively scanning horizontal areas of the image projected by said light rays, thereby causing the light passing to said photocell to vary when the edges of the container image are scanned, converting said variations in light to the photocell in pulses corresponding to the edges of the area being scanned, energizing the beam of a cathode ray tube by said pulses thereby illuminating the cathode ray tube face at points corresponding to the edges of the container, detecting the deviation of said points from predetermined positions on the cathode ray tube corresponding to the position said spots should be in for a standard container and rejecting said container when the spots deviate from said permissible positions.

6. The method of measuring the shape of a glass container which comprises rotating said glass container about its axis, directing light rays against said glass container in a direction perpendicular to the axis of said container, positioning a photocell adjacent said container in the path of said light rays, interposing a scanning mechanism between said photocell and said container for successively scanning horizontal areas of the image projected by said light rays, thereby causing the light passing to said photocell to vary when the edges of the container image are scanned, said pulses corresponding to the background illumination, the first edge of the container, the second edge of the container and the background illumination of said container, energizing a counting circuit by said first pulse, de-energizing said counting circuit by said second pulse, reactivating said counting circuit by said third pulse and stopping said counting circuit by said fourth pulse whereby said counting circuit will register the difference between a fixed distance and the distance between the edges of the cross sectional area, and comparing the reading of said counting circuit with the standard corresponding to the difference between said fixed distance and the diameter of the standard container at a corresponding cross section.

7. The method of measuring the shape of a glass container which comprises rotating said glass container about its axis, directing light rays against said glass container in a direction perpendicular to the axis of said container, positioning a photocell adjacent said container in the path of said light rays, interposing a scanning mechanism between said photocell and said container for successively scanning horizontal areas of the image projected by said light rays, thereby causing the light passing to said photocell to vary when the edges of the container image are scanned, said pulses corresponding to a first pulse representing the background of the container, a second pulse corresponding to one edge of the container, a third pulse corresponding to the other edge of the container and a fourth pulse corresponding to the background of the container, activating the sweep of a hard tube by said second pulse and stopping the sweep of said hard tube by said third pulse thereby producing a voltage corresponding in magnitude to the time between the second and third pulse, and comparing said voltage with the standard voltage corresponding to the diameter of the standard container at a corresponding cross sectional area.

8. In an apparatus for measuring the profile of a glass container, the combination comprising a pad for supporting said glass container, means for rotating said pad, means for directing ultra-violet light rays against said container in a direction generally perpendicular to the axis of the container thereby producing an image of the container, means for scanning successive vertical areas of the image in a horizontal direction, a photocell adjacent said latter means for detecting changes in light projected by said scanning means corresponding to the edges of the container, so that said photocell produces a fluctuating output at points corresponding to the edges of the container, means for converting said fluctuations into pulses separated in time in an amount proportional to the diameter of the area being checked, and means for comparing said pulses against a standard corresponding to the diameter of the corresponding area of a standard container, said last mentioned means comprising a cathode ray tube, a mask over said cathode ray tube corresponding to the permissible deviation of one edge of said container, and means responsive to the pulses produced by said converting means for energizing the beam of said cathode ray tube thereby illuminating said cathode ray tube at a point corresponding to one edge of the container whereby when said point of illumination lies behind said mask, said container is within the permissible dimension for that cross section and when the point of illumination is not behind the mask said container is not within the permissible dimension of that cross section.

9. The combination set forth in claim 8 including photocell means positioned adjacent the base of said cathode ray tube for detecting said deviations of illumination on said cathode ray tube.

10. In an apparatus for measuring the profile of a glass container, the combination comprising a pad for supporting said glass container, means for rotating said pad, means for directing ultra-violet light rays against said container in a direction generally perpendicular to the axis of the container thereby producing an image of the container, means for scanning successive vertical areas of the image in a horizontal direction, a photocell adjacent said latter means for detecting changes in light projected by said scanning means corresponding to the edges of the container, so that said photocell produces a fluctuating output at points corresponding to the edges of the container, means for converting said fluctuations into pulses separated in time in an amount proportional to the diameter of the area being checked, and means for comparing said pulses against a standard corresponding to the diameter of the corresponding area of a standard container, said latter means comprising means for producing a voltage proportional to the time between said pulses and means for comparing said voltage with a standard voltage corresponding to the voltage that would be produced by pulses made in scanning a standard container 11. In an apparatus for measuring the profile of a glass container, the combination comprising a pad for supporting said glass container, means for rotating said pad, means for directing ultra-violet light rays against said container in a direction generally perpendicular to the axis of the container thereby producing an image of the container, means for scanning successive vertical areas of the image in a horizontal direction, a photocell adjacent said latter means for detecting changes in light projected by said scanning means corresponding to the edges of the container, so that said photocell produces a fluctuating output at points corresponding to the edges of the container, means for converting said fluctuations into pulses separated in time in an amount proportional to the diameter of the area being checked, and means for comparing said pulses against a standard corresponding to the diameter of the corresponding area of a standard container, said latter means comprising a counting circuit, a memory circuit having a setting corresponding to the diameter of a standard container at a corresponding cross section, means for causing said pulses to energize said counting circuit and means for comparing the reading of said counting circuit with said memory circuit.

12. In an apparatus for measuring the profile of a glass container, the combination comprising a pad for supporting said glass container, means for rotating said pad, means for directing ultra-violet light rays against said container in a direction generally perpendicular to the axis of the container thereby producing an image of the container, means for scanning successive vertical areas of the image in a horizontal direction, a photocell adjacent said latter means for detecting changes in light projected by said scanning means corresponding to the edges of the container, so that said photocell produces a fluctuating output at points corresponding to the edges of the container, means for converting said fluctuations into pulses separated in time in an amount proportional to the diameter of the area being checked, and means for comparing said pulses against a standard corresponding to the diameter of the corresponding area of a standard container, said pulses corresponding to the background illumination, the first edge of the container, the second edge of the container and the background illumination of the container, a counting circuit, a memory circuit having a setting corresponding to the diameter of the standard container at a corresponding cross section, means for using said first pulse to energize said counting circuit, said second pulse to de-energize said counting circuit, said third pulse to reactivate said counting circuit and said fourth pulse to stop said counting circuit and means for comparing the reading of said counting circuit with said memory circuit.

13. In an apparatus for measuring the profile of a glass container, the combination comprising a pad for supporting said glass container, means for rotating said pad, means for directing ultra-violet light rays against said container in a direction generally perpendicular to the axis of the container thereby producing an image of the container, means for scanning successive vertical areas of the image in a horizontal direction, a photocell adjacent said letter means for detecting changes in light projected by said scanning means corresponding to the edges of the container, so that said photocell produces a fluctuating output at points corresponding to the edges of the container, means for converting said fluctuations into pulses separated in time in an amount proportional to the diameter of the area being checked, and means for comparing said pulses against a standard corresponding to the diameter of the corresponding area of a standard container, said pulses corresponding to a first pulse representing the background of the container, a second pulse corresponding to one edge of the container, a third pulse corresponding to the other edge of the container and a fourth pulse corresponding to the background of the container, a hard tube, means for causing said second pulse to activate the sweep of the hard tube and causing said third pulse to stop the sweep of the hard tube, a memory circuit having a standard voltage setting corresponding to the diameter of a standard container at a corresponding cross section, and means for comparing the voltage of the hard tube with the standard voltage of the memory circuit.

14. In an apparatus for measuring the profile of a glass container, the combination comprising means for rotating the glass container about its axis, means for directing rays of radiant energy against said container in a direction generally perpendicular to the axis of the container thereby producing an image of the container, means for scanning successive vertical areas of the image in a horizontal direction, a photocell adjacent said latter means for detecting changes in light projected by said scanning means corresponding to the edges of the container, so that said photocell produces a fluctuating output at points corresponding to the edges of the container, means for converting said fluctuations into pulses separated in time in an amount proportional to the diameter of the area being checked, and means for comparing said pulses against a standard corresponding to the diameter of the corresponding area of a standard container, said last mentioned means comprising a cathode ray tube, a mask over said cathode ray tube corresponding to the permissible deviation of one edge of said container, and means responsive to the pulses produced by said converting means for energizing the beam of said cathode ray tube thereby illuminating said cathode ray tube at a point corresponding to one edge of the container whereby when said point of illumination lies behind said mask, said container is within the permissible dimension for that cross section and when the point of illumination is not behind said mask said container is not within the permissible dimension for that cross section.

15. The combination set forth in claim 14 including photocell means positioned adjacent the base of said cathode ray tube for detecting said deviations of illumination on said cathode ray tube.

16. In an apparatus for measuring the profile of a glass container, the combination comprising means for rotating the glass container about its axis, means for directing rays of radiant energy against said container in a direction generally perpendicular to the axis of the container thereby producing an image of the container, means for scanning successive vertical areas of the image in a horizontal direction, a photocell adjacent said latter means for detecting changes in light projected by said scanning means corresponding to the edges of the container, so that said photocell produces a fluctuating output at points corresponding to the edges of the container, means for converting said fluctuations into pulses separated in time in an amount proportional to the diameter of the area being checked, and means for comparing said pulses against a standard corresponding to the diameter of the corresponding area of a standard container, said latter means comprising means for producing a voltage proportional to the time between said pulses and means for comparing said voltage with a standard voltage corresponding to the voltage that would be produced by pulses made in scanning a standard container.

17. In an apparatus for measuring the profile of a glass container, the combination comprising means for rotating the glass container about its axis, means for directing rays of radiant energy against said container in a direction generally perpendicular to the axis of the container thereby producing an image of the container, means for scanning successive vertical areas of the image in a horizontal direction, a photocell adjacent said latter means for detecting changes in light projected by said scanning means corresponding to the edges of the container, so that said photocell produces a fluctuating output at points corresponding to the edges of the container, means for converting said fluctuations into pulses separated in time in an amount proportional to the diameter of the area being checked, and means for comparing said pulses against a standard corresponding to the diameter of the corresponding area of a standard container, said latter means comprising a counting circuit, a memory circuit having a setting corresponding to the diameter of a standard container at a corresponding cross section, means for causing said pulses to energize said counting circuit and means for comparing the reading of said counting circuit with said memory circuit.

18. In an apparatus for measuring the profile of a glass container, the combination comprising means for rotating the glass container about its axis, means for directing rays of radiant energy against said container in a direction generally perpendicular to the axis of the container thereby producing an image of the container, means for scanning successive vertical areas of the image in a horizontal direction, a photocell adjacent said latter means for detecting changes in light projected by said scanning means corresponding to the edges of the container, so that said photocell produces a fluctuating output at points corresponding to the edges of the container, means for converting said fluctuations into pulses separated in time in an amount proportional to the diameter of the area being checked, and means for comparing said pulses against a standard corresponding to the diameter of the corresponding area of a standard container, said pulses corresponding to the background illumination, the first edge of the container, the second edge of the container and the background illumination of the container, a counting circuit, a memory circuit having a setting corresponding to the diameter of the standard container at a corresponding cross section, means for causing said first pulse to energize said counting circuit, said second pulse to de-energize said counting circuit, said third pulse to reactivate said counting circuit and said fourth pulse to stop said counting circuit and means for comparing the reading of said counting circuit with said memory circuit.

19. In an apparatus for measuring the profile of a glass container, the combination comprising means for rotating the glass container about its axis, means for directing rays of radiant energy against said container in a direction generally perpendicular to the axis of the container thereby producing an image of the container, means for scanning successive vertical areas of the image in a horizontal direction, a photocell adjacent said latter means for detecting changes in light projected by said scanning means corresponding to the edges of the container so that said photocell produces a fluctuating output at points corresponding to the edges of the container, means for converting said fluctuations into pulses separated in time in an amount proportional to the diameter of the area being checked, and means for comparing said pulses against a standard corresponding to the diameter of the corresponding area of a standard container, said pulses corresponding to a first pulse representing the background of the container, a second pulse corresponding to one edge of the container, a third pulse corresponding to the other edge of the container and a fourth pulse corresponding to the background of the container, a hard tube, means for causing said second pulse to activate the sweep of the hard tube and causing said third pulse to stop the sweep of the hard tube, a memory circuit having a standard voltage setting corresponding to the diameter of a standard container at a corresponding cross section, and means for comparing the voltage of the hard tube with the standard voltage of the memory circuit.

References Cited by the Examiner

UNITED STATES PATENTS

| | | | |
|---|---|---|---|
| 2,502,503 | 4/1950 | Berkley | 209—111 X |
| 2,625,265 | 1/1953 | Cox | 209—111 |
| 2,742,151 | 4/1956 | Milford | 209—111 |
| 2,932,392 | 4/1960 | Burtner | 209—111 |
| 2,999,590 | 9/1961 | Gerhardt | 209—82 |

ROBERT B. REEVES, *Primary Examiner.*

CLAUDE A. LEROY, ROBERT C. RIORDAN,
*Examiners.*

E. D. DREYFUS, A. D. BRUFSKY,
*Assistant Examiners.*